Patented Jan. 22, 1935

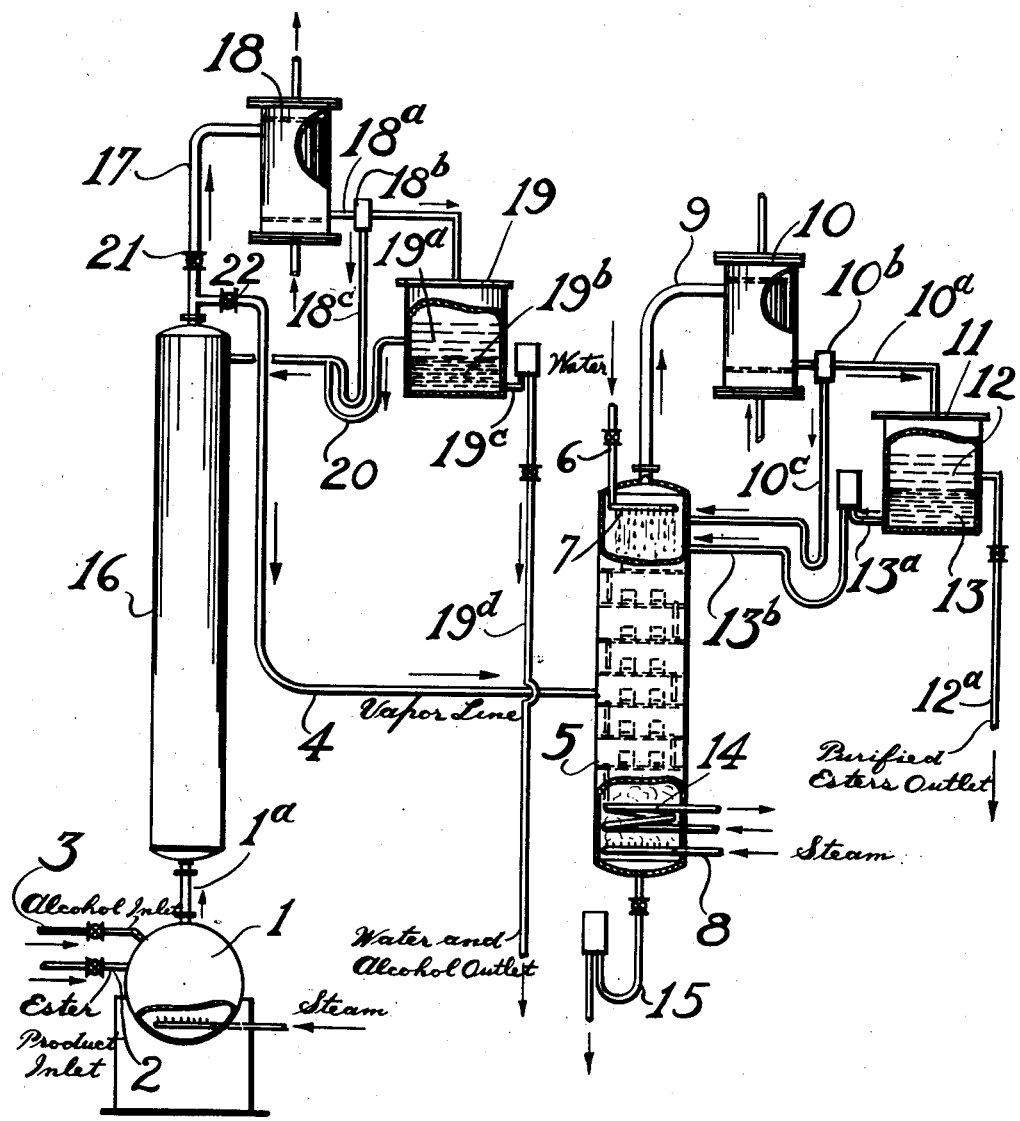

1,988,801

UNITED STATES PATENT OFFICE 1,988,801

METHOD FOR PURIFYING ESTERS

Robert B. Lebo and Clayton M. Beamer, Elizabeth, N. J., assignors to Standard Alcohol Company Application November 6, 1930, Serial No. 493,767

2 Claims. (Cl. 260—106)

This invention relates to a method for purifying esters and particularly to the finishing and rectification of the ester product, and invention will be fully understood from the following description and accompanying drawing, which is a diagrammatic representation of preferred equipment.

In the drawing, 1 represents a still to which is led by a pipe 2 the product resulting from an esterification process, such as the esterification with calcium acetate of reactive acid liquor obtained from the treatment of olefins with sulfuric acid. This product consists of a mixture of esters, hydrocarbon oil, alcohol and free acid, in normal operation the alcohol and acid being present in substantially equi-molecular proportions.

To complete the esterification it is necessary to have an excess of alcohol. Additional alcohol is therefor supplied to the still by a pipe 3. The still is heated in any convenient manner so as to produce a mixture of vapors which rises thru the vapor line 1a to a dephlegmating column 16 and thence thru vapor line 17 to a condenser 18.

Condensate produced in the condenser 18 flows by a pipe 18a provided with the usual trap 18b and reflux line 18c, to a decanter tank 19 in which stratification occurs. The upper layer 19a consists of esters, and unreacted alcohol and minute quantities of acid and is returnd by the trapped line 20 to the tower 16. The lower layer consists largely of water with some alcohol, and is removed by pipe 19c, leaving the system by the water tail pipe 19d.

This operation is continued with the withdrawal of water thru the tail pipe 19d until water ceases to collect in the decanter 19 at which point esterification of the free acid contained in the original charge is complete.

Valve 21 is now closed and valve 22 opened to permit the vapors to pass from tower 16 thru pipe 4 to a purifying tower 5 which may be of the ordinary bubble or baffled tower type. The vapors are introduced into the tower 5 near the central portion thereof and are met by a descending spray of water supplied by pipe 6 and spray head 7. Live steam is supplied to the bottom of the tower by a pipe 8 in sufficient quantity to completely exhaust the esters from the lower part of the tower. Additional heat may be supplied if desired, by means of a steam heating coil 14. Free organic acid, tarry and malodorous products are removed from the ester vapors in the tower 5 by the steam and water and are drawn off with the tail water thru pipe 15.

Vapors leaving the tower by pipe 9 are condensed in condenser 10, the condensate passing by pipe 10a, provided with the usual trap 10b and reflux line 10c, to the decanter tank 11 where stratification again occurs. The upper layer 12 which forms in the decanter 11 comprises the purified esters which are led off by a pipe 12a to storage. This ester product is substantially pure except for a small amount of water contained in it and hence needs only to be dried before it is ready for commercial use. The lower layer 13 which consists largely of water is returned by pipe 13a and reflux line 13b to the tower.

We have found in practice that by the steam and water washing herein disclosed we are able to remove from 90 to 95% of the free organic acid contained in the ester mixture leaving the tower 16 and moreover the product so purified is free from all objectionable odor.

While we have described our invention with reference to one method of procedure it will be understood that it is susceptible of certain modifications and changes and that we desire to claim all such changes, modifications or additions as may come within the scope of our invention as defined in the appended claims.

We claim:

1. Method of producing purified alkyl esters of the aliphatic monocarboxylic acids, which comprises reacting an alkaline earth metal salt of an aliphatic monocarboxylic acid with a mixture of acid liquor and impurities obtained by contacting olefines with sulfuric acid, subjecting the mixture of alkaline-earth metal salt salt of an aliphatic monocarboxylic acid, acid liquor and impurities to distillation in the presence of an added alcohol, condensing the distilled vapors, returning a layer containing the esters to the distillation stage until water formation substantially ceases, then passing the substantially dry vapors to a second distillation stage, subjecting the vapors to steam and countercurrently washing with water, withdrawing and condensing the overhead vapors and separating purified esters from the condensate of water and esters.

2. Method of purifying aliphatic monocarboxylic esters prepared by reacting an alkaline earth metal salt of an aliphatic monocarboxylic acid with a reactive acid liquor obtained from the treatment of olefines with sulfuric acid, which comprises subjecting the reaction mixture containing essentially aliphatic monocarboxylic esters, hydrocarbon oil, alcohol, water and free acid in the presence of an excess of an alcohol to distillation, vaporizing the aliphatic monocarboxylic esters and the water, condensing the vapors, stratifying the condensed vapors to a water layer and a layer containing the aliphatic monocarboxylic esters, subjecting the esters to further distillation to separate substantially all the water and to obtain substantially water-free vapors of the aliphatic monocarboxylic esters, then subjecting the aliphatic monocarboxylic esters to scrubbing in countercurrent flow with water and concurrent flow with steam, condensing the purified vapors and separately withdrawing aliphatic monocarboxylic esters and water.

ROBERT B. LEBO.
CLAYTON M. BEAMER.